United States Patent [19]

Yoshioka et al.

[11] 4,253,512

[45] Mar. 3, 1981

[54] LOW PRESSURE CORDLESS AND TUBELESS TIRE

[75] Inventors: Tomoaki Yoshioka, Miyoshi; Keiji Fujioka, Kishiwada, both of Japan

[73] Assignees: Honda Giken Kogyo Kabushiki Kaisha, Tokyo; Ohtsu Tire Kabushiki Kaisha, Izumiotsu, both of Japan

[21] Appl. No.: 78,704

[22] Filed: Sep. 25, 1979

[30] Foreign Application Priority Data

Sep. 30, 1978 [JP] Japan .................................. 53/133518

[51] Int. Cl.³ ........................ B60C 11/00; B60C 13/00
[52] U.S. Cl. ............................ 152/353 G; 152/330 R; 152/209 WT; 152/353 R; 152/357 A
[58] Field of Search ........... 152/330 R, 352 R, 352 A, 152/353 R, 353 G, 357 A, 209 R, 209 A, 209 B, 209 NT, 209 WT, 209 D

[56] References Cited

U.S. PATENT DOCUMENTS

| | | | |
|---|---|---|---|
| 3,253,635 | 5/1966 | Travers | 152/354 R |
| 4,059,138 | 11/1977 | Mirtain et al. | 152/353 R |
| 4,168,732 | 9/1979 | Monzini | 152/353 R |

FOREIGN PATENT DOCUMENTS 1235147  6/1971  United Kingdom ................ 152/353 G

*Primary Examiner*—John T. Goolkasian
*Assistant Examiner*—Lois E. Boland

[57] ABSTRACT

A low pressure cordless and tubeless tire is provided in the vicinity of the widest portion of the tire body with annular reinforcement ribs extending continuously or discontinuously along the entire circumference of the tire body at the side walls. Adjacent the first annular ribs are second annular ribs located between the side walls and the shoulder region of the tread section. The first and second ribs at each side wall define an annular groove therebetween.

7 Claims, 3 Drawing Figures

LOW PRESSURE CORDLESS AND TUBELESS TIRE

FIELD OF THE INVENTION

This invention relates to a low pressure cordless tubeless tire.

PRIOR ART

For a tire for a general purpose vehicle adapted for driving under low tread pressure conditions in sandy regions, wet ground regions, barren regions or the like, it is generally required that the tread area of the tire be sufficiently great to provide bouyancy and traction to enable the vehicle to traverse said regions, under conditions where the tire pressure is 0.1–0.3 Kg/cm$^2$ while the tire body is soft enough to permit the vehicle to drive under such low tread pressure conditions.

If a conventional cord-reinforced and inflated tire is used under low pressure conditions, such tire has large rigidity due to the reinforcement by the tire cords and deformation of the tire is restricted by the cords. Consequently, it is difficult to obtain a uniform tread pressure and satisfactory driving performance cannot be achieved.

When the vehicle is being sharply cornered, it is desirable that the tire is deformed smoothly from its tread section to its shoulder section and its side wall section for obtaining a large treading area. However, if a conventional cord-reinforced and inflated tire is used, the same is comparatively rigid, so that such a deformation as above cannot be obtained. In the case of use of the same tire in its low pressure condition, when the side wall section thereof is largely deformed, the cords of the tire are liable to be broken by bending thereof.

Accordingly, for a general purpose vehicle, a low pressure cordless and tubeless tire is preferred which comprises only rubber or similar elastic material.

This cordless tire has the characteristic feature that, because all parts of the tire are made of rubber or similar elastic material, the tire can be deformed at all parts thereof, and necessary deformation at any desired part of the tire can be obtained by increasing or decreasing the thickness thereat.

Accordingly, it is desirable for the cordless tire to have a small thickness in the region between its shoulder section and its side section, so that in the course of driving, especially, at the time of cornering, the tire can be easily and smoothly deformed in said region. However, after the tire is deformed and the necessary treading area is obtained, the tire has to provide strength in order to have improved driving performance. If, however, for obtaining this strength, the thickness of said region is increased uniformly and accordingly, the rigidity of the tire is increased, not only is the necessary treading area not obtained but the comfortable riding characteristic of the vehicle is deteriorated.

SUMMARY OF THE INVENTION

An object of the invention is to provide a cordless and tubeless tire in which the conventional softness of the tire to obtain the necessary treading area remains substantially unchanged and the tire is deformable to provide the necessary treading area while additionally the tire has the necessary rigidity for resisting a large cornering force.

In accordance with the invention, there is provided a low pressure cordless and tubeless tire comprising a body having a tread section and side sections, said tread section having end shoulder regions, said body having a region of maximum width and including at each side section in the vicinity of said region of maximum width a first annular reinforcement rib extending along the entire circumference of the tire body and at least one second annular reinforcement rib located between said side section and the shoulder region of the tread section, said second rib extending along the entire circumference of the tire body and defining an annular groove with said first said annular reinforcement rib.

DETAILED DESCRIPTION

Figure 1:
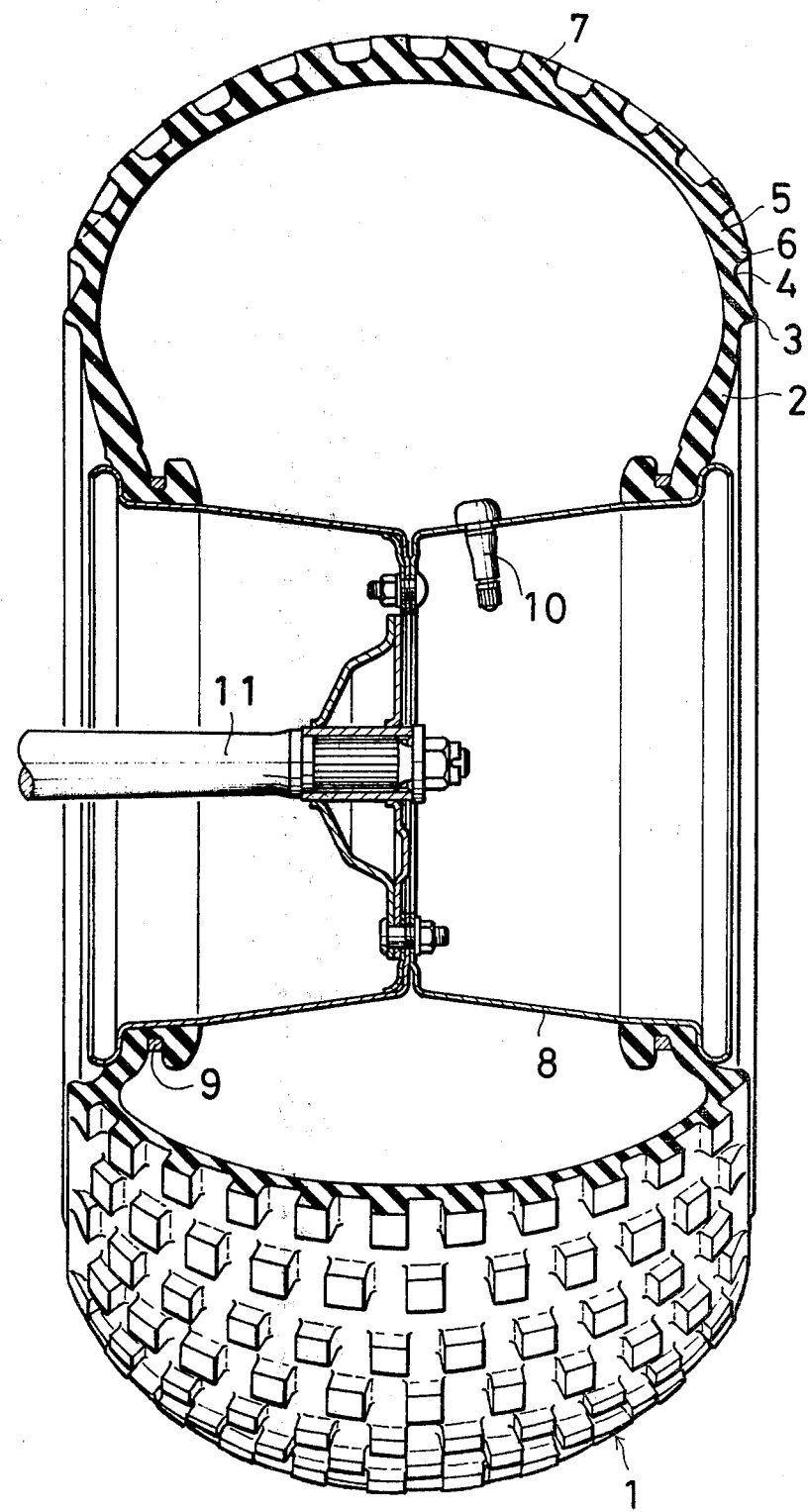
FIG. 1 is a side view, partly in section, of one embodiment of the tire according to the invention.

Referring to the drawings, therein is seen a cordless and tubeless tire body 1 having a side section 2 on each side of the tire body 1, the sections 2 being provided at or near the widest portion of the tire body 1 with a first annular reinforcement rib 3 which extends continuously or discontinuously over the entire circumference of the tire body 1. Additionally, there is provided a second annular reinforcement rib 6 in a region between each side section 2 and each shoulder section 5. This region is not brought into contact with the ground during ordinary straight driving conditions of the vehicle but is brought into contact with the ground at the time of cornering of the vehicle. The second annular reinforcement rib 6 extends continuously or discontinuously over the entire circumference of the tire and forms an annular groove 4 with the rib 3.

Numeral 7 denotes a tread section of the tire body 1, numeral 8 denotes a wheel rim, numeral 9 denotes a bead on each side of the tire body, numeral 10 denotes a rim valve and numeral 11 denotes a wheel axle.

Figure 2:
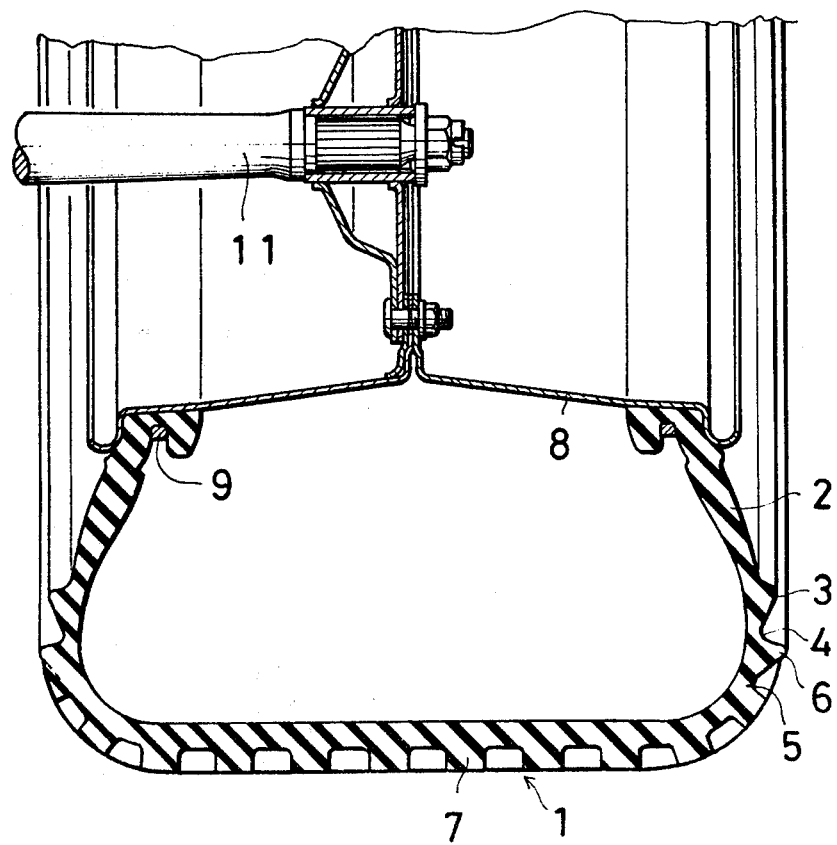
FIG. 2 is an enlarged sectional side view of a portion of the tire in its deformed state at the time of straight driving.

The tire of the invention operates as follows:

At the time of ordinary straight driving or of gentle cornering, as shown in FIG. 2, the contact of the tire 1 with the ground is substantially at the tread section 7, and the deformation of the region from the shoulder section 5 to the side section 2 can provide more comfortable riding conditions than the conventional cordless tire, since the tire body 1 can undergo bending at the annular groove 4 formed between the ribs 3 and 6.

Figure 3:
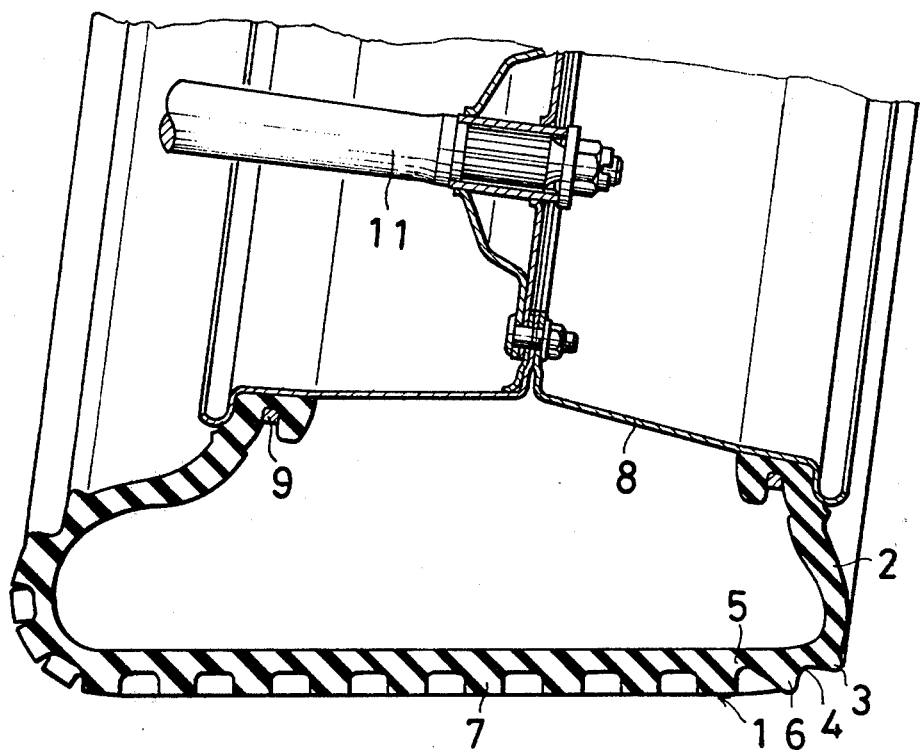
FIG. 3 is an enlarged sectional side view of the tire in its deformed state at the time of cornering.

The deformation of the tire body (1) at the time of sharp cornering is shown in FIG. 3. Namely, the deformation of the tire body (1) in its diametrically sectional direction when the cornering begins can be easily effected because the annular groove (4) is formed between the two ribs (3) (6) to decrease the thickness. When the deformation is completed and the ribs (3) (6) are in contact with the earth, a large tread force can be obtained by the rigidity and the uneven surface of the ribs (3) (6). Accordingly, the tire body can exhibit good driving conditions at the time of sharp cornering.

The degree of deformation of the tire body 1 at the time of cornering varies according to the degree of cornering. Accordingly, it is necessary for the first annular reinforcement rib 3 to be at or near the widest position of the tire body 1 corresponding to the largest tread area, while additionally, it is necessary for the second annular reinforcement rib 6 to be in the region extending from the side section 2 to the shoulder section 5. In the case of large size tires one or more additional ribs 6 can be provided.

The tire of the invention is a soft cordless tire providing comfortable riding performance while attaining improvement in the driving performance and it also has the following additional advantages. Namely, when an obstacle on the road surface contacts the region between the shoulder section 5 and the side section 2 in FIG. 2, the reinforcement ribs 3, 6, prevent the relatively thin portion of the tire body 1 from becoming damaged thereby, and additionally even if a large obstacle grazes the side wall of the tire, the first reinforcement rib 3 provided in the vicinity of the widest portion of the tire acts to prevent the side wall from becoming scratched and scuffed. Furthermore, even when the tire body 1 is substantially deformed as shown in FIG. 3, the reinforcement ribs 3, 6 serve to prevent the side wall from being damaged by an obstacle or due to unevenness of the road surface.

Thus, the reinforcement ribs 3, 6 serve to prevent the shoulder section 5 and the side section 2 of the tire 1 from becoming damaged and prevent the tire body 1 from being punctured. In light of this advantage, it is desirable that each reinforcement rib have a particular tapered sectional shape, for instance, triangular, semicircular, trapezoidal or the like, such that when an obstacle strikes the rib, the contact force thereof is not applied thereon concentrically and instead the obstacle slips and escapes therefrom. In other words, the contact force does not act concentrically or locally. According to experiments conducted by the inventors, it has been confirmed that good results are obtained when the rib has the cross-sectional shape of a scalene triangle and is so arranged that the long side thereof is directed towards the outside and the short side thereof is directed towards the inside in relation to the center axis of the tire.

What is claimed is:

1. A low pressure cordless and tubeless tire comprising a body having a tread section and side sections, said tread section having end shoulder regions, said body having a region of maximum width and including at each side section in the vicinity of said region of maximum width a first annular reinforcement rib extending along the entire circumference of the tire body, and at least one second annular reinforcement rib located between said side section and the shoulder region of the tread section, said second rib extending along the entire circumference of the tire body and defining an annular groove with said first annular reinforcement rib, the operating pressure of said tire being between 0.1 and 0.3 Kg/cm$^2$.

2. A tire as claimed in claim 1 wherein said ribs are parallel to one another.

3. A tire as claimed in claim 1 wherein said ribs are tapered in cross-section.

4. A tire as claimed in claim 3 wherein said ribs have the cross-sectional shape of scalene triangles.

5. A tire as claimed in claim 4 wherein the long side of each scalene triangle faces outwardly and the short side faces inwardly in relation to the center axis of the tire.

6. A tire as claimed in claim 1 wherein said groove has a V-shaped cross-section.

7. A tire as claimed in claim 1 wherein the body of the tire is constituted uniformly of elastic material.

* * * * *